United States Patent [19]

Hammett

[11] Patent Number: 4,860,556
[45] Date of Patent: Aug. 29, 1989

[54] AIR COOLING AND DIRECTING APPARATUS

[76] Inventor: Rawlings H. Hammett, P.O. Box 307, Grandview, Mo. 64030

[21] Appl. No.: 232,959

[22] Filed: Aug. 17, 1988

[51] Int. Cl.$^4$ ............................................. F25D 17/04
[52] U.S. Cl. ......................................... 62/406; 62/426
[58] Field of Search ................. 62/426, 406, 430, 530

[56] References Cited

U.S. PATENT DOCUMENTS

| | | | |
|---|---|---|---|
| 662,541 | 11/1900 | Miskolczy | 62/406 X |
| 1,874,843 | 8/1932 | Adler, Jr. | 62/426 |
| 2,067,004 | 1/1937 | Spengler | 62/406 X |
| 2,481,964 | 7/1958 | Anderson | 62/426 |
| 3,774,410 | 11/1973 | Hans | 62/406 X |
| 4,612,774 | 9/1986 | Budreau | 62/406 X |
| 4,751,827 | 6/1988 | Villareal | 62/426 X |

*Primary Examiner*—Lloyd L. King
*Attorney, Agent, or Firm*—Norman B. Rainer

[57] ABSTRACT

A plastic container which confines a freezable liquid is provided with a multitude of parallel channels which permit passage of air through the container. The container is mountable upon the protective enclosure of a multi-bladed air-moving fan in a manner such that air driven by the fan passes through the channels and is thereby cooled. The container is of a small enough size to permit its storage within a residential-type freezer to freeze the liquid prior to mounting of the container upon the fan.

6 Claims, 1 Drawing Sheet

U.S. Patent
Aug. 29, 1989
4,860,556
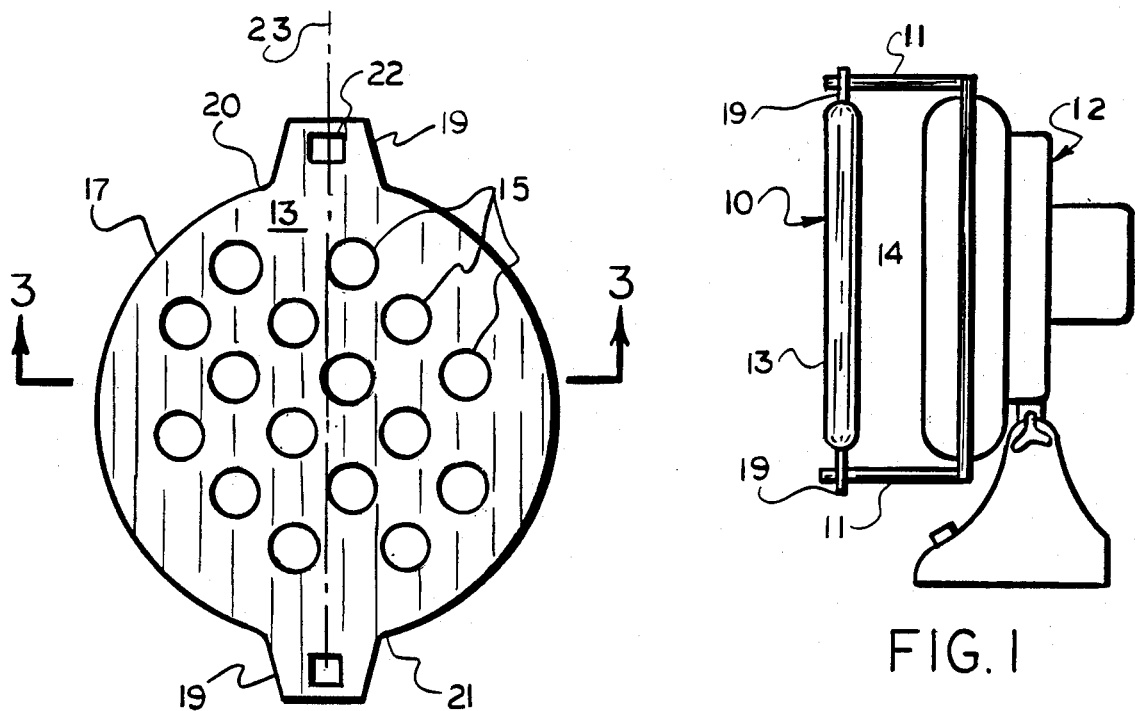
FIG.2
FIG.1
FIG.3
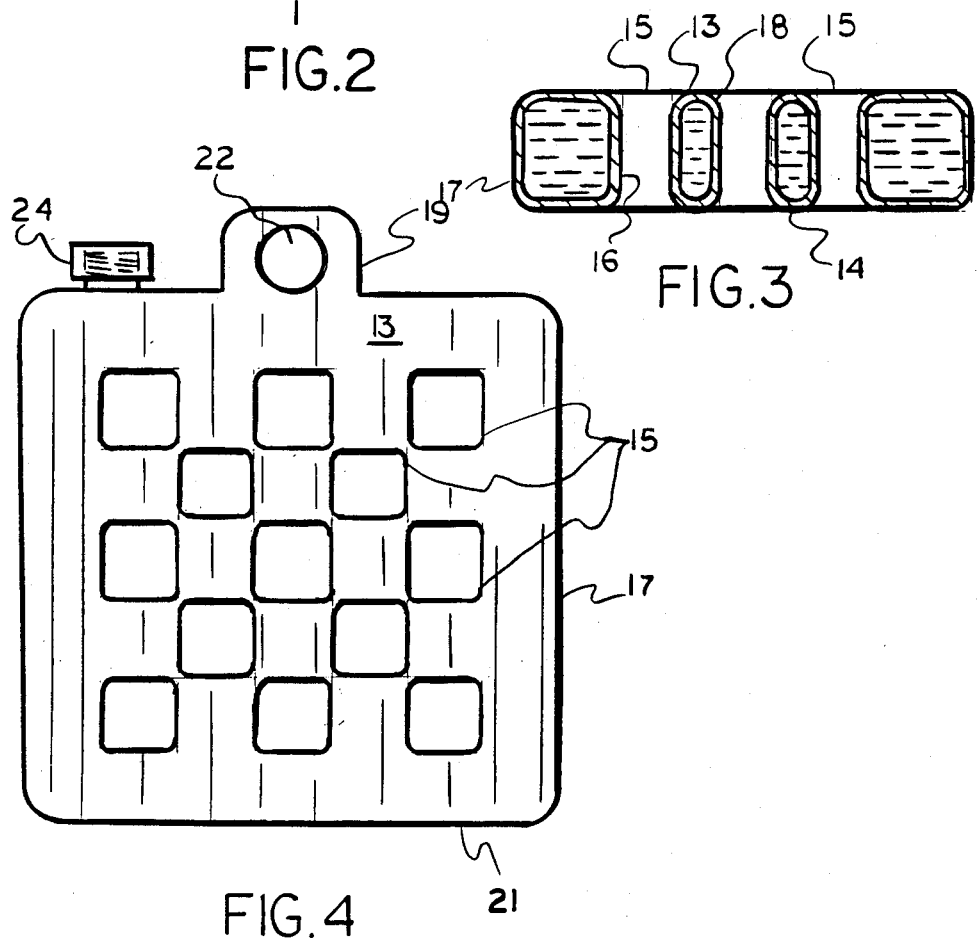
FIG.4

AIR COOLING AND DIRECTING APPARATUS

BACKGROUND OF THE INVENTION

This invention relates to air cooling apparatus, and more particularly concerns apparatus for generating, cooling and directing a flow of air for the comfort of the user.

Air conditioning devices which utilize electrical refrigeration systems having compressors and expansion coils are well known. However, such devices are often costly and not easily portable, and often require specialized installation considerations.

Air cooling devices wherein a fan blows air across ice are disclosed in U.S. Pat. Nos. 4,612,774; 4,177,652; 2,557,004; 2,841,964 and 1,952,414. In general, such devices require specialized means for holding the ice in an air-permeable disposition and collecting the water which forms as the ice melts. Also, such prior devices often lack the ability to readily or adjustably advance air in varied specific directions.

It is accordingly an object of the present invention to provide apparatus for enabling an air circulating device such as a fan to produce a cooled stream of air.

It is another object of this invention to provide apparatus as in the foregoing object which will retain ice and can be attached to said air circulating device.

It is a further object of the present invention to provide apparatus of the aforesaid nature which is air permeable.

It is still another object of this invention to provide apparatus of the aforesaid nature of rugged, durable construction amenable to low cost manufacture.

It is yet another object of the present invention to provide in combination an apparatus of the aforesaid nature operatively attached to a rotary air circulation device.

These objects and other objects and advantages of the invention will be apparent from the following description.

SUMMARY OF THE INVENTION

The above and other beneficial objects and advantages are accomplished in accordance with the present invention by a plastic container having a configuration characterized in having opposed parallel front and rear surfaces, a high ratio of total surface area to confined volume, a multitude of channels that extend between said front and rear surfaces, and means for attaching said container to an air circulation device.

In preferred embodiments, the container is of monolithic construction, having been fabricated of a thermoplastic polymer by a molding operation. Suitable thermoplastic polymers include polyethylene, polypropylene, plasticized polyvinylchloride, and interpolymers of acrylonitrile, butadiene and styrene. Preferred polymer compositions are those which yield a somewhat resilient, non-breaking molded structure.

The container is intended to confine a freezable liquid such as water or water-containing compositions. The freezable liquid may be entered into the container at the time of its fabrication, in which case the container will be completely sealed. In an alternative embodiment, the container may be equipped with a closeable opening permitting the purchaser to fill the container with water. The container preferably has a configuration amenable for stacking or clustering as a compact grouping. A preferred configuration is a disk-like shape having a diameter in the range of about 8 to 12 inches and having a waffle-like pattern of channels extending between the opposed parallel surfaces of the disk configuration. The thickness of the wall structure of the container is preferably substantially uniform and is of a magnitude to provide structural durability adequate to withstand repeated freeze-thaw cycles, yet thin enough to expedite rapid heat transfer. Accordingly, wall thickness in the range 0.5 to 1.5 mm may be employed, depending upon the nature of the plastic and the container configuration.

In use, the container, filled with a freezable liquid is placed in a home freezer unit until the liquid has solidified. The container is then disposed in front of an air blowing device such as a fan or squirrel-cage blower. The container will usually be positioned several inches from the air blowing device and oriented such that the normal flow of air will penetrate the channels. In the case of an air oscillating fan, the container is mounted to the front of the fan so that it will move within the fan.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 1 is a side view of an embodiment of the container of this invention shown in association with an electric fan.

FIG. 2 is a front view of the container of FIG. 1.

FIG. 3 is a sectional view taken upon the line 3—3 of FIG. 2.

FIG. 4 is a front view of a first alternative embodiment of the container.

DESCRIPTION OF THE PREFERRED EMBODIMENT

Referring to FIG. 1, an embodiment of the air cooling and directing apparatus of the present invention is shown comprised of a container 10 of freezable liquid suspended by bracket means 11 in front of a rotary electric fan 12.

The exemplified embodiment of container 10, as shown more clearly in FIGS. 2-4, has front and rear surfaces 13 and 14, respectively, which are of identical configuration. Said front and rear surfaces may, in some embodiments, merely constitute planes which contain forwardmost or rearwardmost portions of the container. A multitude of identical channels 15 of circular cylindrical contour extend perpendicularly between said front and rear surfaces, and are disposed in a uniformly spaced array. In preferred embodiments, the length of the channels is greater than their diameter. By virtue of such manner of construction, greater porosity is presented to the fan, yet a large volume of water may be held by the container. The spacing between channels is preferably as small as possible consistent with adequate structural integrity of the container.

The total surface of the container available for heat transfer includes the aforesaid front and rear surfaces, wall surfaces 16 of the channels, and perimeter surface 17. When the total surface area is measured and compared to the total volume of water confined by the container, it is found that maximum cooling capacity with a high rate of heat transfer is achieved when the ratio of surface area (cm$-2$) to volume (cm$-3$) is between about 1 and 20 cm−1. Such preferred configurations of containers will also have channels wherein the ratio of length to diameter (L/D) is between about 0.5 and 10, and the ratio of front surface area to channel area is between about 2 and 0.3. In particularly preferred embodiments of the container, the shoulders 18 leading into the channel from the front or rear surface of the container are tapered or curved so as to cause a streamline passage of air through the channels.

Attaching means in the form of tabs 19 are associated with the upper and lower extremities 20 and 21, respectively, of the exemplified embodiment. The tabs are continuous integral extensions of the perimeter of the container, and contain apertures 22 adapted to engage bracket means 11. The container will in general have one or more of said attaching means disposed upon a line or plane of symmetry such as plane of symmetry 23 indicated in FIG. 2. A closeable opening 24 may be incorporated into the container, preferably in an uppermost portion of perimeter 17.

The frozen disk technology of the present invention is useful in cooling air, particularly in enclosed environments such as a home, boat, automotive vehicles and camping enclosure structures.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A plastic container for a freezable liquid, said container being of monolithic construction having been fabricated of a thermoplastic polymer by a molding operation and being further characterized in having:
    (a) upper and lower extremities,
    (b) opposed parallel front and rear surfaces,
    (c) a high ratio of total surface area to confined volume,
    (d) a multitude of parallel channels that extend between said front and rear surfaces,
    (e) a plane of symmetry that bisects said upper and lower extremities,
    (f) attaching means for removably associating said container with an air circulation device, said attaching means being apertured tabs associated with said upper and lower extremities and centered upon said plane of symmetry.
    (g) a closable opening permitting entrance and egress of said liquid, and
    (h) a configuration amenable to the stacking of a number of said containers in a compact grouping 2. The container of claim 1 wherein said polymer is chosen so as to produce a somewhat resilient, non-breaking molded container.

3. The container of claim 2 defined by wall structure having a uniform thickness between 0.5 and 1.5 millimeters.

4. The container of claim 2 wherein the ratio of surface area to volume is between about 1 and 20 cm−1.

5. The container of claim 2 wherein said channels have curved shoulders adjacent said front and rear surfaces for the purpose of streamlining passage of air through the channels.

6. An air cooling and directing apparatus comprising a multi-bladed oscillating fan having a circular protective enclosure, bracket means extending horizontally from said enclosure, and a container of claim 2 supported by the interengagement of said bracket means with said attaching means.

* * * * *